United States Patent
Kuriyama (10) Patent No.: US 7,450,366 B2
(45) Date of Patent: Nov. 11, 2008

(54) SOLID ELECTROLYTIC CAPACITOR

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 40 days.

(21) Appl. No.: 10/589,776

(22) PCT Filed: Feb. 25, 2005

(86) PCT No.: PCT/JP2005/003192

§ 371 (c)(1),
(2), (4) Date: Aug. 17, 2006

(87) PCT Pub. No.: WO2005/083729

PCT Pub. Date: Sep. 9, 2005

(65) Prior Publication Data

US 2007/0159770 A1    Jul. 12, 2007

(30) Foreign Application Priority Data

Feb. 27, 2004   (JP) ............... 2004-054204

(51) Int. Cl.
  *H01G 9/00*   (2006.01)
(52) U.S. Cl. ............ 361/523; 361/516; 361/525; 361/528; 361/529; 361/540; 29/25.01; 29/25.03
(58) Field of Classification Search ......... 361/523–525, 361/516–519, 508–512, 528–534, 540–541, 361/525–528; 29/25.01, 25.03
See application file for complete search history.

(56) References Cited

U.S. PATENT DOCUMENTS

| | | | | |
|---|---|---|---|---|
| 5,629,830 A | * | 5/1997 | Yamagami et al. | 361/535 |
| 6,249,424 B1 | * | 6/2001 | Nitoh et al. | 361/523 |
| 6,343,004 B1 | * | 1/2002 | Kuranuki et al. | 361/523 |
| 6,392,869 B2 | * | 5/2002 | Shiraishi et al. | 361/523 |
| 6,467,142 B1 | * | 10/2002 | Shirashige et al. | 29/25.42 |
| 6,625,009 B2 | * | 9/2003 | Maeda | 361/528 |
| 6,751,086 B2 | * | 6/2004 | Matsumoto | 361/523 |
| 6,816,358 B2 | * | 11/2004 | Kida et al. | 361/540 |
| 2003/0053286 A1 | | 3/2003 | Masuda et al. | |
| 2003/0223180 A1 | | 12/2003 | Aoyama | |

FOREIGN PATENT DOCUMENTS

| | | |
|---|---|---|
| JP | 52-31840 | 3/1977 |
| JP | 2000-12387 | 1/2000 |
| JP | 2001-6977 | 1/2001 |
| JP | 2001-57319 | 2/2001 |
| JP | 2003-101311 | 4/2003 |
| JP | 2003-163137 | 6/2003 |
| JP | 2003-347163 | 12/2003 |

OTHER PUBLICATIONS

International Search Report for PCT/JP2005/003192, date of mailing: May 31, 2005.

* cited by examiner

*Primary Examiner*—Nguyen T Ha
(74) *Attorney, Agent, or Firm*—Hamre, Schumann, Mueller & Larson, P.C.

(57) ABSTRACT

A solid electrolytic capacitor (A1) includes a porous sintered body (1) of valve metal, internal anode terminals (11a, 11b) projecting from the porous sintered body, and external anode terminals (21a, 21b) positioned lower than the internal anode terminals and having a bottom surface utilized for surface-mounting. The internal anode terminals (11a, 11b) are provided at a position lower than the center of the porous sintered body (1) in the height direction of the porous sintered body.

18 Claims, 12 Drawing Sheets

SOLID ELECTROLYTIC CAPACITOR

TECHNICAL FIELD

The present invention relates to a solid electrolytic capacitor including a porous sintered body of valve metal.

BACKGROUND ART

Figure 13:
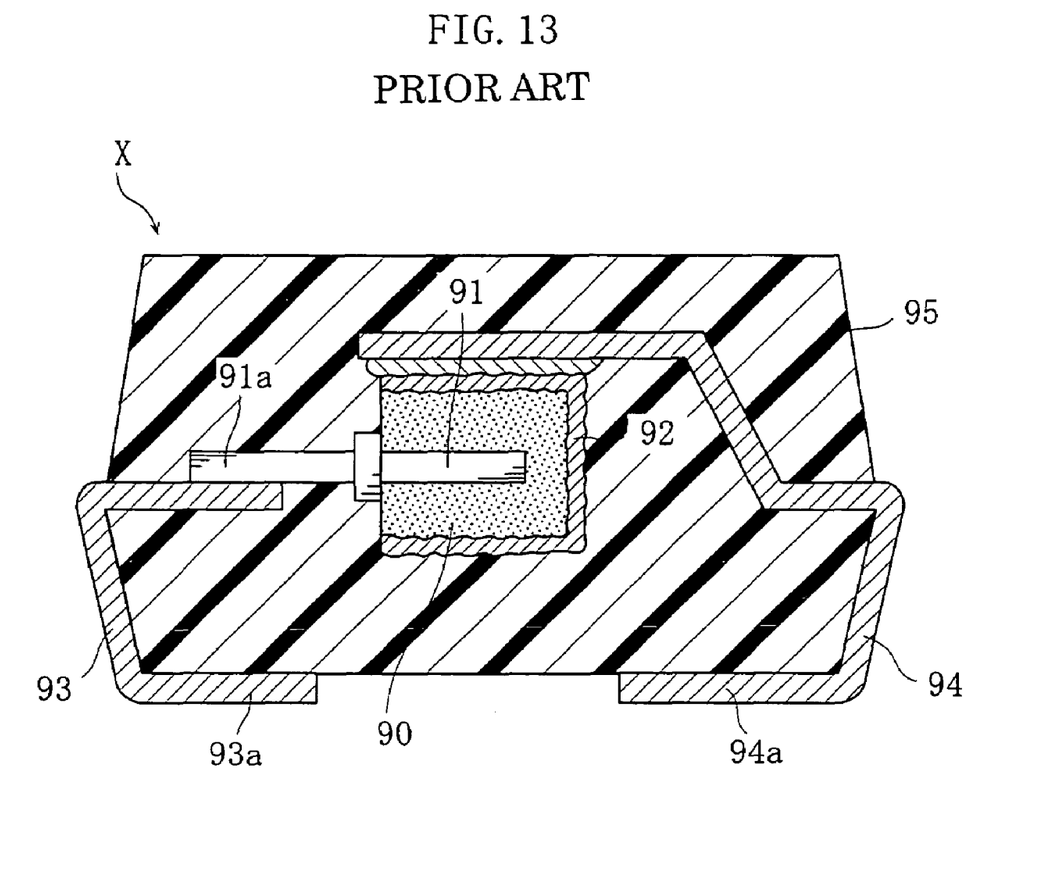
FIG. 13 is a sectional view showing a conventional solid electrolytic capacitor.

As is known, a solid electrolytic capacitor is used for canceling a noise generated from a device such as a CPU or stabilizing a power supply system for an electronic apparatus. FIG. shows the solid electrolytic capacitor disclosed in the Patent Document described below. The illustrated solid electrolytic capacitor X includes a porous sintered body made of metal having valve action (hereinafter simply referred to as "valve metal"). An intered body 90. The anodeanode wire 91 is provided to be partially embedded in the porous s wire 91 has a portion projecting from the porous sintered body 90, and the projecting portion serves as an internal anode terminal 91a. A conductive resin film 92 is formed on the porous sintered body 90 to serve as a cathode. Conductive members 93 and 94 are electrically connected to the internal anode terminal 91a. and the conductive resin 92, respectively. The conductive members 93 and 94 include portions exposed on the protective resin 95, and the exposed portions serve as an external anode terminal 93a and an external cathode terminal 94a for external connection. For noise cancellation and stabilizing the power supply system, the high-frequency characteristics of the solid electrolytic capacitor X needs to be enhanced.

Patent Document 1: JP-A-2003-163137

Generally, the frequency characteristics of impedance Z of a solid electrolytic capacitor are determined by the following formula 1.

$$Z=\sqrt{(R^2+(1/\omega C-\omega L)^2)}$$

($\omega$: 2πf(f: frequency), C: Capacitance, R: Resistance, L: Inductance) [Formula 1]

As will be understood from the above formula, in a frequency region lower than the self-resonant frequency, $1/\omega C$ is determinant. Therefore, in this frequency region, the impedance can be reduced by increasing the capacitance of the solid electrolytic capacitor. In a frequency region near the self-resonant frequency (high frequency region), the resistance R is dominant. Therefore, to reduce the ESR (equivalent series resistance) of the solid electrolytic capacitor is desirable. Further, in an ultra high frequency region higher than the self-resonant frequency, $\omega L$ is dominant. Therefore, the ESL (equivalent series inductance) of the solid electrolytic capacitor needs to be reduced.

Also in the conventional solid electrolytic capacitor X, various measures are taken to reduce the ESR and ESL. Specifically, to reduce the ESR and ESL, the shape of the porous sintered body 90 or the shape of the node wire 91 is improved, or the material of a solid electrolytic layer formed in the porous sintered body 90 is improved.

However, since recent CPUs tend to have a higher clock number, a noise including a higher frequency component tends to be generated. Further, in accordance with a speed increase and digitalization of electronic devices, a power supply system capable of responding at high speed is needed. Therefore, with respect to a solid electrolytic capacitor used for such a purpose, further reduction of ESL is demanded.

Under such circumstances, the above-described solid electrolytic capacitor X has the following problem. Although the shapes of the porous sintered body 90 and the anode wire 91 are improved to reduce the inductances, the inductances of other parts (e.g. conductive members 93, 94) are not reduced. Therefore, such a structure cannot sufficiently fulfill the demand for a low ESL. Thus, in the solid electrolytic capacitor X, there is still room for improvement with respect to the reduction of the ESL of the entire device.

DISCLOSURE OF THE INVENTION

The present invention is conceived under the circumstances described above. It is, therefore, an object of the present invention to provide a solid electrolytic capacitor capable of decreasing the ESL.

According to the present invention, there is provided a solid electrolytic capacitor comprising a porous sintered body of valve metal, an internal anode terminal projecting from the porous sintered body, and an external anode terminal positioned lower than the internal anode terminal and having a bottom surface utilized for surface-mounting. The internal anode terminal is provided at a position lower than center, in a height direction, of the porous sintered body. For instance, the internal anode terminal may be embedded in the porous sintered body in contact with the bottom surface of the porous sintered body. Alternatively, the internal anode terminal may be fixed to the bottom surface of the porous sintered body from outside of the porous sintered body.

With this structure, the distance from the external anode terminal to the internal anode terminal can be reduced. In the current path between the solid electrolytic capacitor and the substrate on which the capacitor is mounted, the portion between the external anode terminal and the internal anode terminal stands vertically. Such a standing portion serves as an inductance with respect to alternating current in a high frequency region containing harmonics and causes the impedance of the entire solid electrolytic capacitor to increase. Therefore, by making the standing portion small, the inductance can be reduced, whereby the ESL in a high frequency region can be reduced.

Preferably, the porous sintered body comprises a plurality of flat sintered elements. The sintered elements are laminated in the thickness direction with each of the elements standing. With this structure, the volume of the porous sintered body of the capacitor can be increased to increase the capacitance. Since each of the sintered element is flat, the current path extending therethrough is short, which is advantageous for decreasing the ESL. Further, by laminating the plurality of sintered elements in the thickness direction with each of the elements standing, the internal anode terminal for each of the sintered elements can be arranged at a lower portion of the solid electrolytic capacitor. Therefore, each of the internal anode terminals is arranged at a low position with respect to the external anode terminal, which is advantageous for increasing the capacitance of the capacitor and decreasing the ESL.

Preferably, the solid electrolytic capacitor further comprises a cathode metal plate which is bonded to a lower surface of the porous sintered body and at least part of which serves as an external cathode terminal. In this case, t bottom surface of the external anode terminal and the bottom surface of the external cathode terminal are flush with each other.

With this structure, the cathode metal plate is not bulky in the vertical direction. Therefore, the bottom surface of the external anode terminal can be positioned close to the porous sintered body, so that the distance from the bottom surface of the external anode terminal to the internal anode terminal can be further reduced. Therefore, this structure is suitable for decreasing the ESL of the solid electrolytic capacitor. Since the bottom surface of the external anode terminal and the bottom surface of the external cathode terminal are flush with each other, this structure is convenient for surface-mounting the solid electrolytic capacitor.

Preferably, the cathode metal plate includes a center portion, and an end portion serving as the external cathode terminal. A stepped portion is provided between the center portion and the end portion. The center portion includes an upper surface bonded to the porous sintered body and a lower surface covered by resin.

With this structure, the number of parts constituting the capacitor can be reduced, and the resistance and inductance between the external cathode terminal and the porous sintered body can be further reduced. Further, the resin insulates the center portion from the outside. Therefore, the center portion is prevented from being electrically connected to part of the substrate on which the solid electrolytic capacitor is mounted.

Preferably, the internal anode terminal comprises a first anode wire and a second anode wire. The first anode wire and the second anode wire project from the porous sintered body in different directions from each other.

When a plurality of anode wires are used in this way, current flows into the anode wires in a branched manner, which is advantageous for decreasing the ESR and the ESL. Since the anode wires project in different directions, each of the anode wires can be arranged at a lower portion of the porous sintered body for decreasing the ESL. Unlike this, when all the anode wires project in the same direction, i.e., collectively arranged at one surface of the porous sintered body, it is difficult to arrange all the anode wires at a lower portion of the porous sintered body.

Further, by utilizing the first and the second anode wires as inputting or outputting internal anode terminals, the capacitor can be designed as a so-called three-terminal (or four-terminal) solid electrolytic capacitor, so that the high-frequency characteristics can be enhanced.

Preferably, the first anode wire and the second anode wire project in opposite directions from each other. With this structure, the first anode wire and the second anode wire can be spaced from each other and arranged at a lower portion of the porous sintered body. When a plurality of sintered elements are laminated with each of the elements standing, the first and the second anode wires are arranged to project perpendicularly to the lamination direction of the sintered elements. By this arrangement, the first and the second anode wires can be properly provided at a lower portion of each of the sintered elements.

Preferably, the solid electrolytic capacitor further comprises a conductive member connecting the first anode wire and the second anode wire to each other.

With this structure, the first anode wire and the second anode wire can be electrically connected in parallel, which is advantageous for decreasing the resistance. Further, in a three-terminal or four-terminal solid electrolytic capacitor, a bypass current path can be formed by utilizing the conductive member, which enables the circuit current to flow so as to detour around the porous sintered body. For instance, by setting the resistance of the bypass current path to be lower than the resistance of the porous sintered body, a DC component of the circuit current can be caused to flow through the bypath current path to reduce the heat generation at the porous sintered body.

Preferably, the conductive member includes a metal cover covering at least part of the porous sintered body.

With this structure, the porous sintered body can be protected by the metal cover. As compared with e.g. a protective resin member for protecting the porous sintered body, the metal cover has higher mechanical strength. Therefore, even when heat is generated at the porous sintered body, the entire solid electrolytic capacitor is prevented from unduly warping. Further, since the metal cover is superior in thermal conductivity to the protective resin member, it is suitable for dissipating heat generated at the porous sintered body and hence, suitable for increasing the allowable power loss of the solid electrolytic capacitor.

Preferably, the conductive member includes an anode metal plate. The anode metal plate is laminated on a lower surface of the porous sintered body via an insulating member and includes a portion serving as an external anode terminal.

With this structure, the anode metal plate can be provided as a flat plate without a stepped portion, so that the inductance between the first anode wire and the second anode wire can be reduced.

Preferably, the solid electrolytic capacitor further comprises a cathode metal plate intervening between the porous sintered body and the insulating member. The cathode metal plate includes a portion serving as an external cathode terminal.

With this structure, the distance between the substrate on which the solid electrolytic capacitor is mounted and the anode metal plate can be reduced. Therefore, the current path between the substrate and the anode metal plate can be shortened, which is advantageous for decreasing the inductance.

Other features and advantages of the present invention will become more apparent from the detailed description given below with reference to the accompanying drawings.

BEST MODE FOR CARRYING OUT THE

INVENTION

Preferred embodiments of the present invention will be described below in detail with reference to the accompanying drawings.

Figure 1:
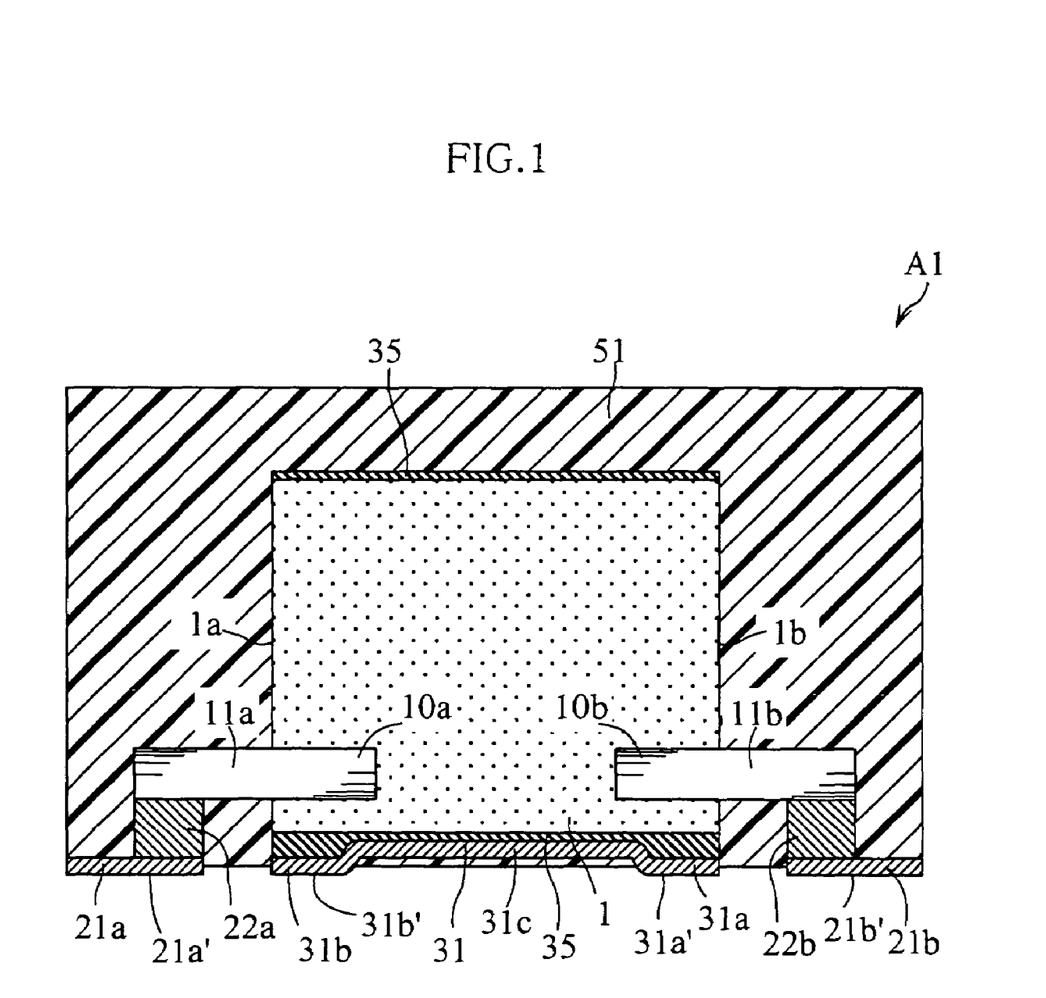
FIG. 1 is a sectional view showing a solid electrolytic capacitor according to a first embodiment of the present invention.
Figure 2:
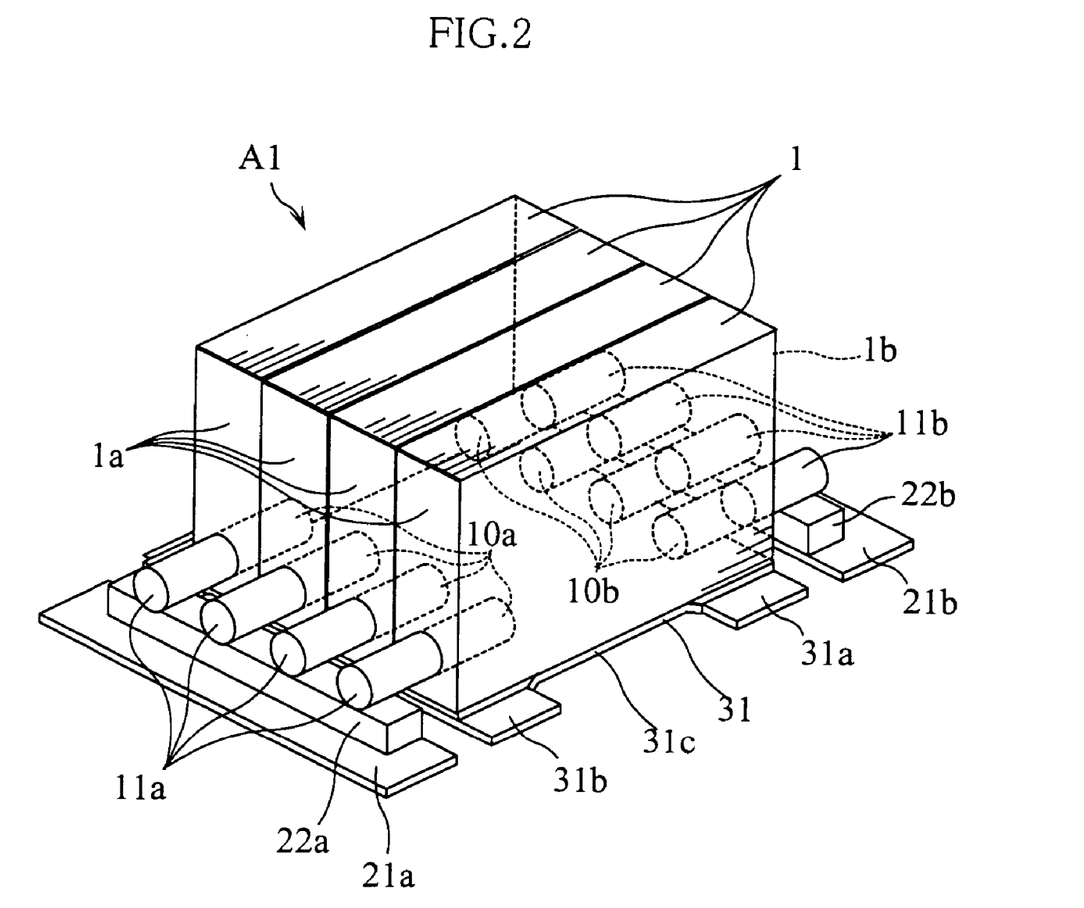
FIG. 2 is a perspective view showing the solid electrolytic capacitor of FIG. 1.

FIGS. 1 and 2 show a solid electrolytic capacitor according to a first embodiment of the present invention. The illustrated solid electrolytic capacitor A1 includes four porous sintered bodies (sintered elements) 1 and eight anode wires (anode bars) 10a and 10b, and a protective resin member 51 covering the porous sintered bodies 1. In FIG. 2, the protective resin member 51 is omitted.

The four porous sintered bodies 4 are formed by compacting niobium powder which is valve metal powder into rectangular plates and then sintering the rectangular plates. Each of the porous sintered bodies 1 is formed with a dielectric layer (not shown) in the pores inside and on an outer surface thereof, and a solid electrolytic layer (not shown) is formed on the dielectric layer. As the material of the porous sintered body 1, any valve metal can be used, and tantalum may be used instead of niobium. The four porous sintered bodies 1 are in a standing posture and laminated in the thickness direction thereof. The porous sintered bodies 1 are bonded together by conductive resin 35. Instead of the conductive resin 35, silver paste may be used, for example.

Similarly to the porous sintered bodies 1, the eight anode wires 10a, 10b are made of valve metal such as niobium, for example. Of these anode wires, four anode wires 10a for inputting extend into the four porous sintered bodies 1, respectively, through first side surfaces 1a of the porous sintered bodies 1, whereas four anode wires 10b for outputting extend into the four porous sintered bodies 1, respectively, through second side surfaces 1b of the porous sintered bodies 1. The inputting or outputting anode wires 10a, 10b include portions projecting out from the porous sintered bodies 1, and the projecting portions serve as inputting or outputting internal anode terminals 11a, 11b. The internal anode terminals 11a and 11b are provided at locations lower than the center of the porous sintered bodies 1 in the height direction. The inputting or outputting internal anode terminals 11a and 11b are electrically connected to inputting or outputting external anode terminals 21a and 21b via conductive members 22a and 22b, respectively. The inputting or outputting external anode terminals 21a and 21b include portions covered by the protective resin member 51, which will be described later, and exposed portions 21a' and 21b' which are utilized for surface-mounting the solid electrolytic capacitor A1.

A cathode metal plate 31 is provided on the lower surfaces of the porous sintered bodies 1 and electrically connected to the solid electrolytic layers (not shown) formed on the porous sintered bodies 1. As the material of the cathode metal plate 31, use may be made of a Cu alloy or a Ni alloy, for example. The cathode metal plate 31 is bent to form stepped portions between the center portion 31c and the opposite ends, and the opposite ends serve as inputting or outputting external cathode terminals 31a, 31b. The upper surface of the center portion 31c is bonded to the solid electrolytic layers of the porous sintered bodies 1 via the conductive resin 35, whereas the lower surface of the center portion 31c is covered by the protective resin member 51, which will be described later. The lower surfaces 31a' and 31b' of the inputting or outputting external cathode terminals 31a and 31b are utilized for surface-mounting the solid electrolytic capacitor A1. In this way, the solid electrolytic capacitor A1 is designed as a so-called four-terminal solid electrolytic capacitor including inputting or outputting external anode terminals 21a, 21b and inputting or outputting external cathode terminals 31a, 31b.

The protective resin member 51 covers the porous sintered bodies 1, anode wires 10a, 10b and so on to protect these parts. The protective resin member 51 may be made of thermosetting resin such as epoxy resin.

Next, the operation and advantages of the solid electrolytic capacitor A1 will be described.

When the solid electrolytic capacitor A1 is used for noise cancellation, for example, an AC component included in the circuit current flows from the external anode terminals 21a, 21b into the porous sintered bodies 1 through the internal anode terminals 11a, 11b. When the solid electrolytic capacitor is used for power supply, the electrical energy stored in the porous sintered bodies 1 flows, as a current with a sharp rising edge, through the internal anode terminals 11b and is discharged from the outputting external anode terminal 21b. In any case, alternating current in a high frequency region or a current similar to this flows between the external anode terminals 21a, 21b and the porous sintered bodies 1 through the internal anode terminals 11a, 11b and the conductive members 22a, 22b. In these current paths, the portion constituted by the conductive member 22a, 22b is a vertically standing portion where the direction of the current flow changes. This portion, as compared with the neighboring portions, has a higher inductance as it becomes longer with respect to e.g. alternating current in a high frequency region containing harmonics. In this embodiment, the internal anode terminals 11a, 11b are arranged at locations lower than the center of the porous sintered bodies 1 in the height direction. Therefore, the distance between the internal anode terminals 11a, 11b and the external anode terminals 21a, 21b is reduced, so that the height of the conductive members 22a, 22b is small. Accordingly, the inductance of the standing portions is reduced, which reduces the ESL of the entire solid electrolytic capacitor A1. As a result, noise cancellation performance with respect to a high frequency region is enhanced, and high responsiveness in power supply can be realized.

Further, since the solid electrolytic capacitor A1 includes four porous sintered bodies 1, the volume of the porous sintered bodies 1 is large, which leads to a high capacitance. Since each of the porous sintered bodies 1 is thin, the distance between the portion of each of the anode wires 10a, 10b which is embedded in the porous sintered body 1 and the conductive resin 35 formed on the outer surface of the porous sintered body 1 is relatively small. Therefore, the current path through the porous sintered body 1 is short, so that the ESR and ESL can be reduced. Moreover, each of the four porous sintered bodies 1 is placed standing up. Unlike this embodiment, when a plurality of thin porous sintered bodies are stacked vertically with each lying down, the distance from the internal anode terminal provided at an upper one of the porous sintered bodies to the external anode terminal is larger than that from the internal anode terminal provided at a lower one of the porous sintered bodies to the external anode terminal. In this embodiment, however, by arranging the internal anode terminals 11a, 11b at lower portions of the porous sintered bodies 1, the distance to the external anode terminals 21a, 21b can be reduced with respect to every internal anode terminal 11a, 11b. Therefore, the ESL of the solid electrolytic capacitor A1 can be advantageously reduced.

Since the respectively four inputting or outputting internal anode terminals 11a, 11b are electrically connected in parallel, current flows to each of the internal anode terminals 11a, 11b in a branched manner in performing noise cancellation or power supply, which is advantageous for reducing the ESR and ESL. Further, the inputting internal anode terminals 11a and the outputting internal anode terminals 11b are provided at opposite surfaces of the porous sintered bodies 1 so as to project in opposite directions. Therefore, unlike the structure in which all the internal anode terminals project in the same direction, the internal anode terminals 11a, 11b are not collected at one location of the porous sintered body 1. Therefore, all the inputting or outputting internal anode terminals 11a, 11b can be properly arranged at lower portions of the porous sintered bodies 1.

The cathode metal plate 31 is generally flat and does not bulge vertically. Since the cathode metal plate 31 is placed between the porous sintered bodies 1 and a substrate on which the solid electrolytic capacitor A1 is to be mounted, the distance between the porous sintered bodies 1 and the substrate is reduced due to the flat shape. Accordingly, the distance between the internal anode terminals 11a, 11b and the external anode terminals 21a, 21b can be reduced, which is advantageous for reducing the ESL.

Since both of the external cathode terminals 31a, 31b comprise part of the cathode metal plate 31, the resistance and inductance therebetween is small. Therefore, this structure is advantageous for reducing the ESR and the ESL of the cathode side in the solid electrolytic capacitor A2 of the four-terminal type. The center portion 31c of the cathode metal plate 31 is covered by the protective resin member 51. Therefore, when the solid electrolytic capacitor A2 is mounted on a substrate, undesirable electrical connection with a wiring pattern formed on the substrate can be avoided. Therefore, the solid electrolytic capacitor can function properly.

FIGS. 3-10 illustrate other embodiments of the present invention. In these figures, the elements which are identical or similar to those of the first embodiment are designated by the same reference signs as those used for the first embodiment.

Figure 3:
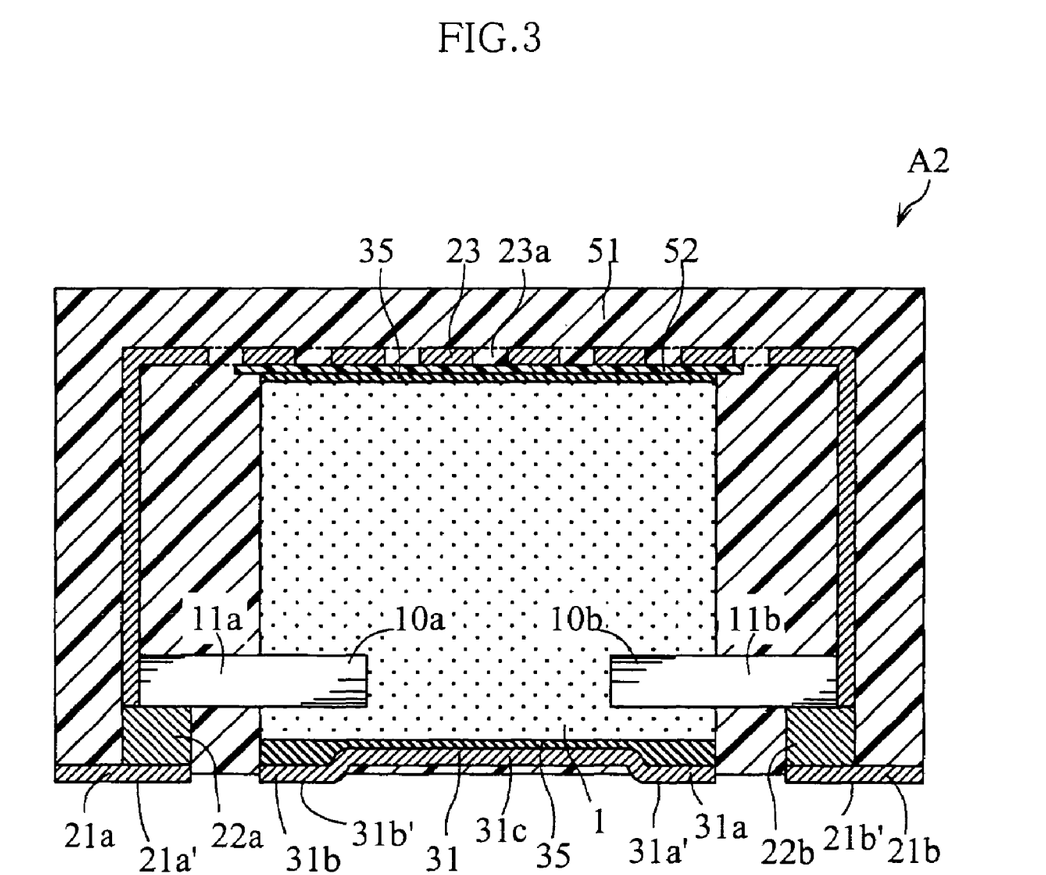
FIG. 3 is a sectional view showing a solid electrolytic capacitor according to a second embodiment of the present invention.
Figure 4:
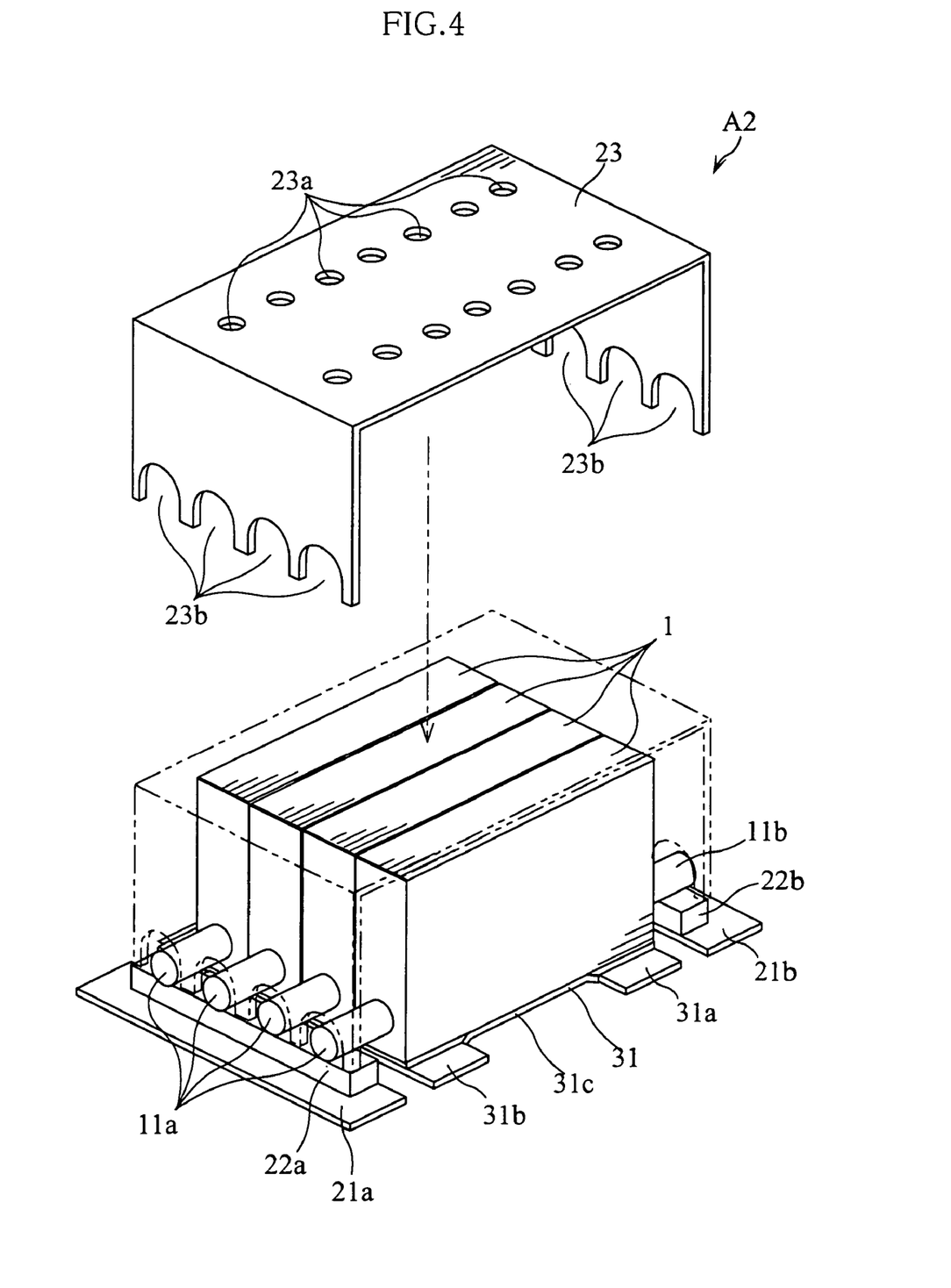
FIG. 4 is a perspective view showing a principal portion of the solid electrolytic capacitor of FIG. 3.
Figure 5:
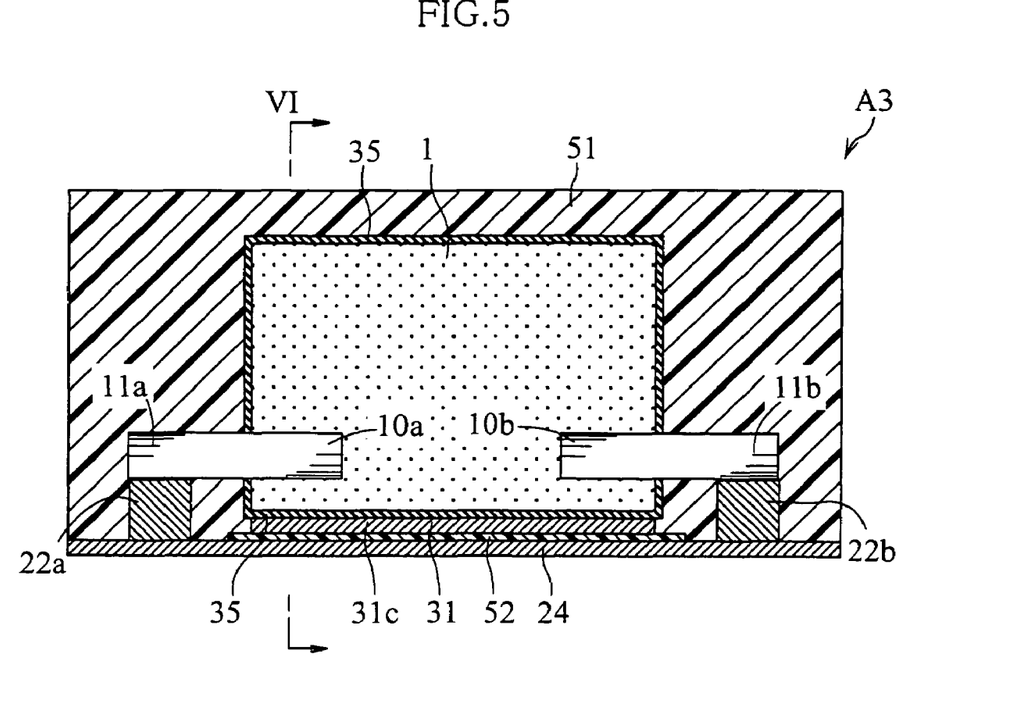
FIG. 5 is a sectional view showing a solid electrolytic capacitor according to a third embodiment of the present invention.
Figure 6:
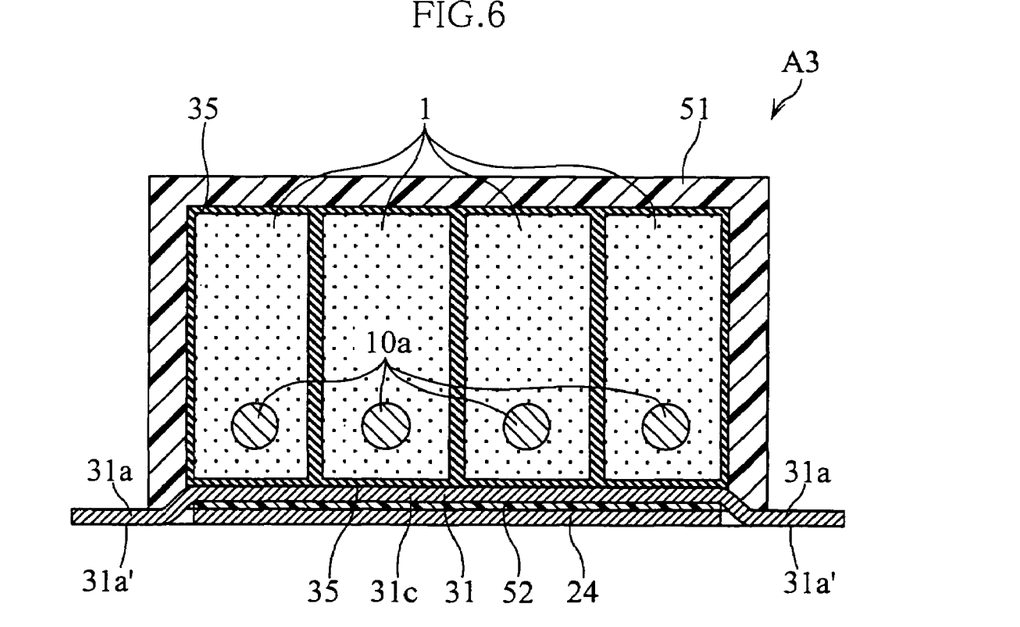
FIG. 6 is a sectional view taken along lines VI-VI in FIG. 5.

FIGS. 3 and 4 show a solid electrolytic capacitor according to a second embodiment of the present invention. The illustrated solid electrolytic capacitor A2 differs from the foregoing solid electrolytic capacitor A1 in that the capacitor A2 includes a metal cover 23 for electrically connecting the inputting internal anode terminals 11a and the outputting internal anode terminals 11b.

The metal cover 23 is made of copper, for example, and accommodates four porous sintered bodies 1. The metal cover 23 has opposite ends each of which is formed with four recesses 23b capable of fitting around the inputting or outputting internal anode terminals 11a, 11b. By utilizing the recesses 23b, the metal cover 23 and the inputting or outputting internal anode terminals 11a, 11b are bonded together by welding, for example. Therefore, the inputting or outputting internal anode terminals 11a, 11b are electrically connected to the metal cover 23. The metal cover 23 is made of copper, which has higher conductivity than that of niobium as the material of the porous sintered bodies 1 and has a width generally equal to that of the porous sintered bodies 1, so that the resistance of the metal cover is relatively low. The metal cover 23 includes an upper plate portion formed with a plurality of holes 23a. By utilizing the holes, liquid resin as the material of the protective resin member 51 can be easily introduced between the metal cover 23 and the porous sintered bodies 1 in forming the protective resin member.

A resin film 52, which serves to provide insulation between the metal cover 23 and the conductive resin 35, is bonded to the metal cover 23 and the conductive resin 35 with an adhesive (not shown). As the resin film 52, use may be made of a polyimide-based film (e.g. Kapton® available from Du Pont Kabushiki Kaisha). Since a polyimide-based film have excellent heat resistance and insulation performance, it does not change in quality even when heated to a relatively high temperature in the process of manufacturing the solid electrolytic capacitor A2. Therefore, a polyimide-based film is suitable for enhancing the insulation between the metal cover 23 and the conductive resin 35.

According to the second embodiment, between the inputting internal anode terminals 11a and the outputting internal anode terminals 11b, a bypass current path is formed which enables the circuit current to flow so as to detour around the porous sintered bodies 1. Since the metal cover 23 has a width which is generally equal to that of the porous sintered bodies 1 and is made of copper having high conductivity, the resistance of the metal cover is relatively low. For example, therefore, when circuit current flows from the inputting internal anode terminals 11a to the outputting internal anode terminals 11b, an AC component as a noise can be guided to the porous sintered bodies 1, whereas a DC component other than that can be caused to flow through the bypass current path. Therefore, even when the circuit as the target of noise cancellation or power supply is provided with a device such as a HDD which requires a high direct current, the high current is prevented from flowing through the porous sintered bodies 1, so that the porous sintered bodies 1 is prevented from producing excessive heat. When the solid electrolytic capacitor A2 is used for power supply, the electrical energy stored in the porous sintered bodies 1 can be discharged not only from the outputting internal anode terminals 11b but also from the inputting internal anode terminals 11a via the metal cover 23. Therefore, high current supply and high responsiveness can be realized.

The metal cover 23 has a sufficiently high mechanical strength. Therefore, even when the porous sintered bodies 1 generate heat, the solid electrolytic capacitor A2 is prevented from being entirely deformed. Therefore, the protective resin member 51 is prevented from cracking, so that the exposure of the porous sintered bodies 1 to the air is prevented. Further, the metal cover 23 is superior in thermal conductivity to the protective resin member 51. Therefore, heat dissipation from the porous sintered bodies 1 to the outside can be promoted. Therefore, the allowable power loss of the solid electrolytic capacitor A2 can be increased, which is advantageous for adaptation to high power supply.

Figure 7:
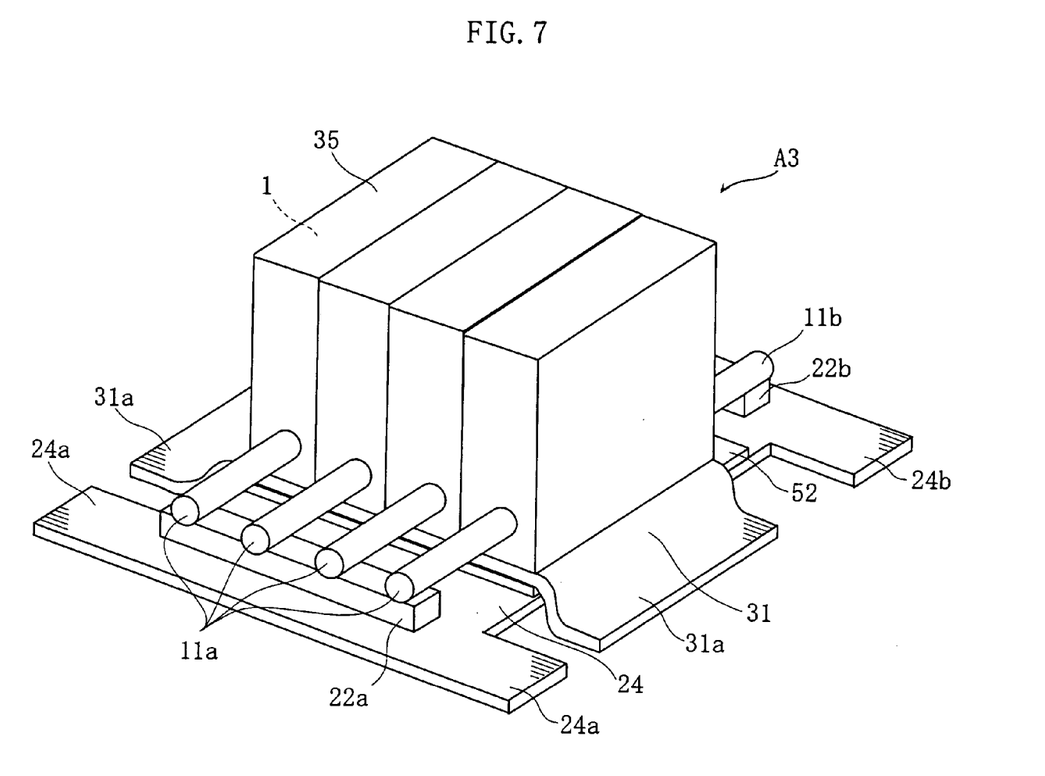
FIG. 7 is a perspective view showing the solid electrolytic capacitor of the third embodiment.
Figure 8:
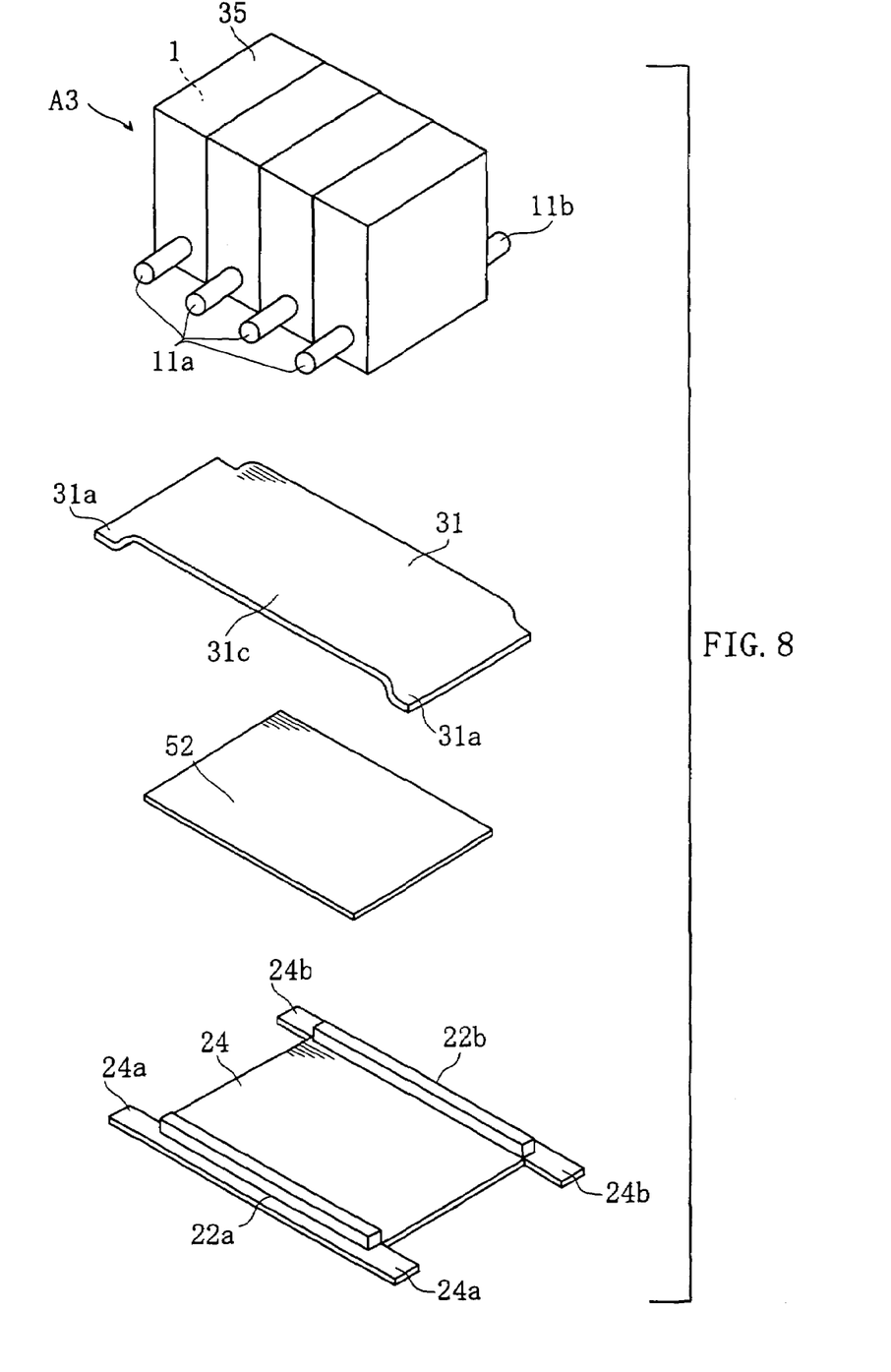
FIG. 8 is an exploded perspective view showing a principal portion of the solid electrolytic capacitor of the third embodiment.
Figure 9:
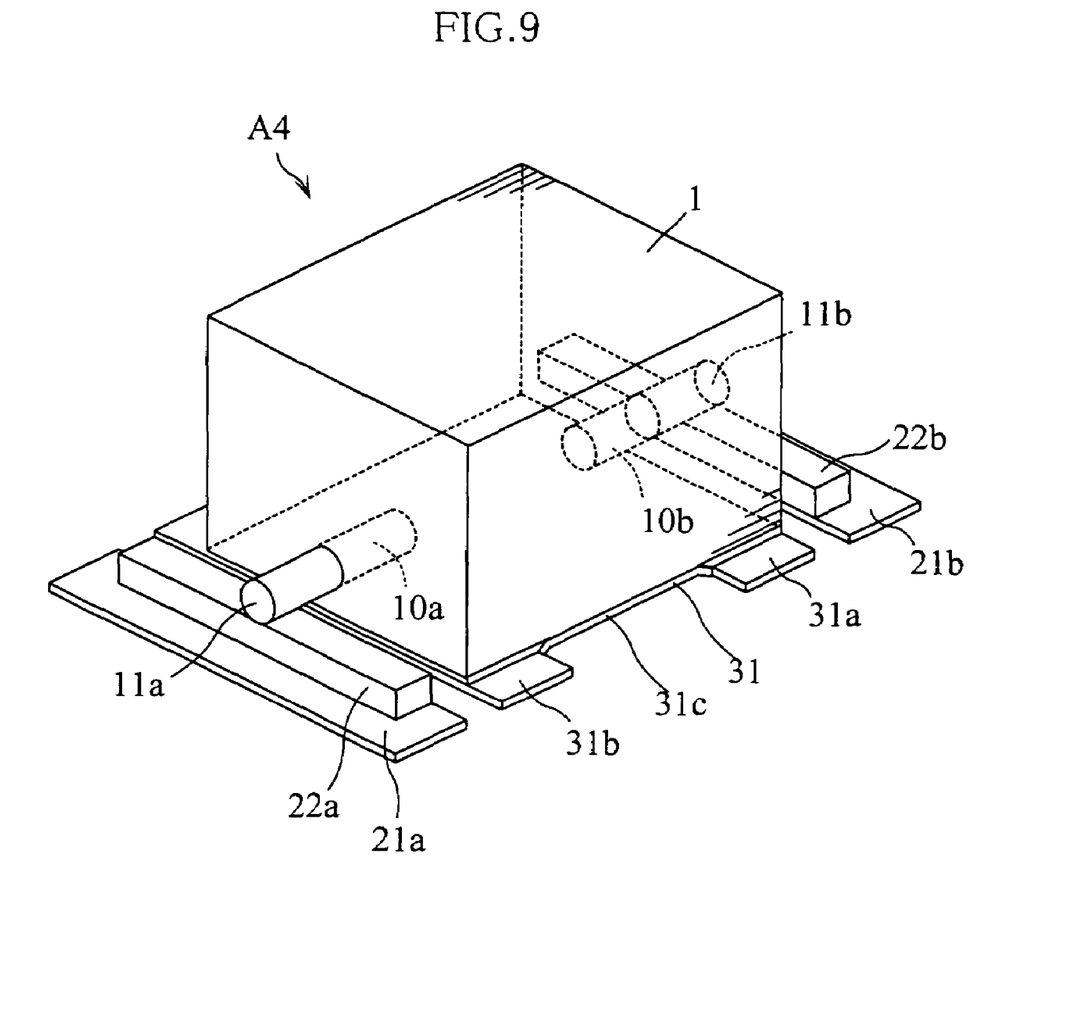
FIG. 9 is a perspective view showing a solid electrolytic capacitor according to a fourth embodiment of the present invention.

FIGS. 5-8 show a solid electrolytic capacitor according to a third embodiment. The illustrated solid electrolytic capacitor A3 differs from the foregoing solid electrolytic capacitor A2 in that the inputting internal anode terminals 11a and the outputting internal anode terminals 11b are electrically connected to each other by an anode metal plate 24. In FIGS. 7 and 8, the protective resin member 51 is omitted.

The solid electrolytic capacitor A3 is provided with the anode metal plate 24 and a cathode metal plate 31. The cathode metal plate 31 includes a center portion 31c bonded to the bottom surfaces of the porous sintered bodies 1 via a conductive resin 35 and is electrically connected to solid electrolytic layers (not shown) formed in the porous sintered bodies 1. The cathode metal plate 31 includes two extensions projecting from the center portion 31c, and the extensions serve as external cathode terminals 31a.

The anode metal plate 24 is laminated on the lower surface of the center portion 31c of the cathode metal plate 31 via a resin film 52. The anode metal plate 24 has opposite ends adjacent to which conductive members 22a, 22b are bonded for electrical connection to the inputting or outputting internal anode terminals 11a, 11b. As a result, the inputting or outputting internal anode terminals 11a, 11b are electrically connected to each other via the anode metal plate 24, and a bypass current path is formed between the inputting internal anode terminals 11a and the outputting internal anode terminals 11b. The anode metal plate 24 is formed with two extensions which serve as inputting or outputting external anode terminals 24a, 24b. A stepped portion is formed between the center portion 31c of the cathode metal plate 31 and each of the external cathode terminals 31a. The bottom surfaces of the external anode terminals 24a, 24b and the bottom surfaces of the external cathode terminals 31a are generally flush with each other. As the material of the anode metal plate 24 and the cathode metal plate 31, a Cu alloy or a Ni alloy may be used, for example.

According to the third embodiment, both of the anode metal plate 24 and the cathode metal plate 31 are in the form of a generally flat plate and the resin film 52 can be easily formed to be thin, so that the height of the portion where these are laminated is small. In the solid electrolytic capacitor A3, there exist a current path between the external anode terminals 24a, 24b and the porous sintered bodies 1, a current path between the external cathode terminals 31a and the porous sintered bodies 1, and the above-described bypass current path. The height of these current paths from the bottom surface of the solid electrolytic capacitor A3 is small and may be generally equal to or smaller than the height of the inputting or outputting internal anode terminals 11a, 11b, for example. Therefore, the inductance of these current paths relative to alternating current is small, which is advantageous for reducing the ESL.

In the process of manufacturing the solid electrolytic capacitor A3, the anode metal plate 24, the resin film 52, the cathode metal plate 31 and the conductive members 22a, 22b can be assembled in advance into an integral part, and then, after the porous sintered bodies 1 are formed, the integral part and the porous sintered bodies 1 can be bonded together. Therefore, the manufacturing process can be simplified and the productivity can be enhanced as compared with the manufacturing process in which a plurality of members for providing the external anode terminals and the external cathode terminals are bonded one by one to the porous sintered bodies 1.

As described above, it is preferable that the solid electrolytic capacitor according to the present invention includes a plurality of thin porous sintered bodies (sintered elements) laminated together. However, the present invention is not limited thereto, and a single porous sintered body 1 may be provided, like the solid electrolytic capacitor A4 shown in FIG. 9. In this case again, the ESL can be reduced by arranging the internal anode terminals 11a, 11b at a lower portion of the porous sintered body 1. Although it is preferable that the inputting internal anode terminal 11a and the outputting internal anode terminal 11b project in opposite directions, the present invention is not limited to such a structure. For instance, the internal anode terminals 11a and 11b may project in directions perpendicular to each other.

Figure 10:
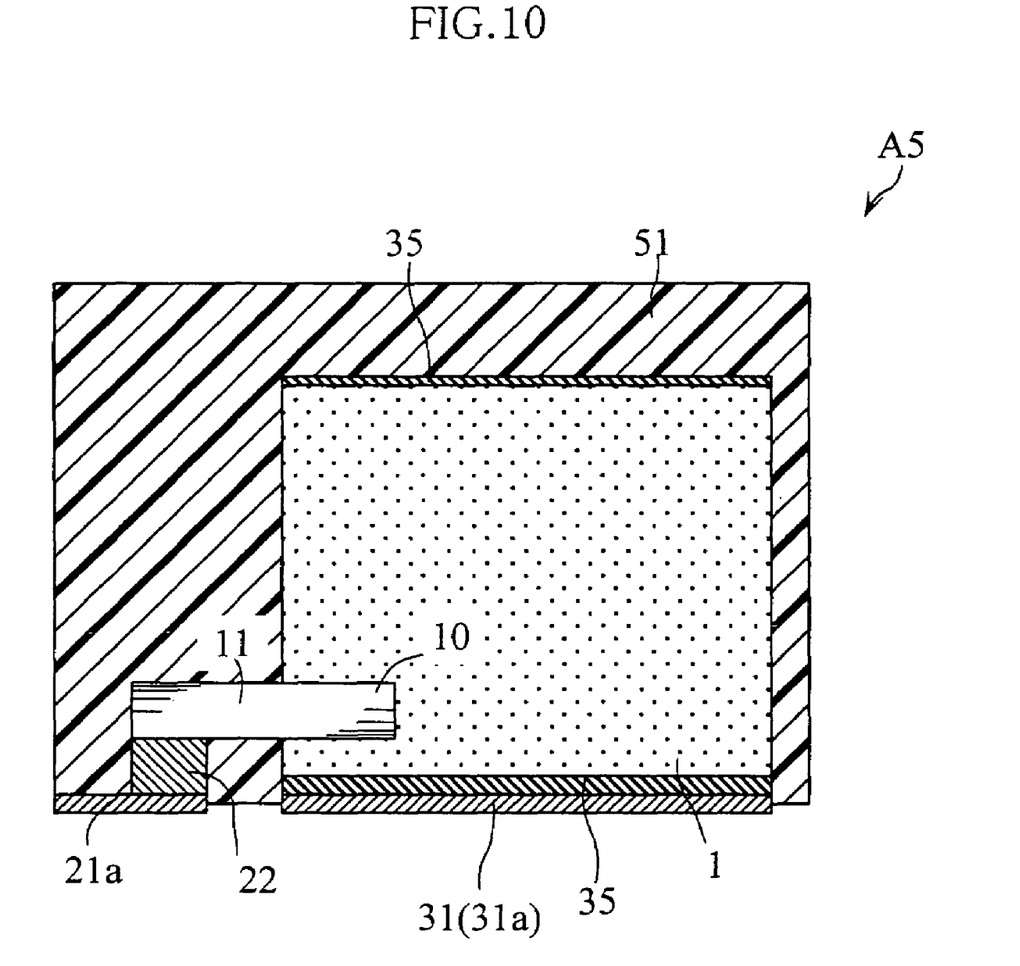
FIG. 10 is a sectional view showing a solid electrolytic capacitor according to a fifth embodiment of the present invention.

FIG. 10 shows an embodiment of solid electrolytic capacitor designed as a two-terminal type. The solid electrolytic capacitor A5 includes an external anode terminal 21a electrically connected to an internal anode terminal 11, and an external anode terminal 31a. As noted before, the structure including an inputting internal anode terminal and an outputting internal anode terminal is preferable for enhancing the noise cancellation and the high-frequency characteristics. However, even with the two-terminal structure like this embodiment, the ESL can be advantageously reduced by arranging the internal anode terminal 11 at a lower portion of the porous sintered body 1.

The solid electrolytic capacitor according to the present invention is not limited to the foregoing embodiments. Specific structures of the parts of the solid electrolytic capacitor according to the present invention may be varied in various ways.

Figure 11:
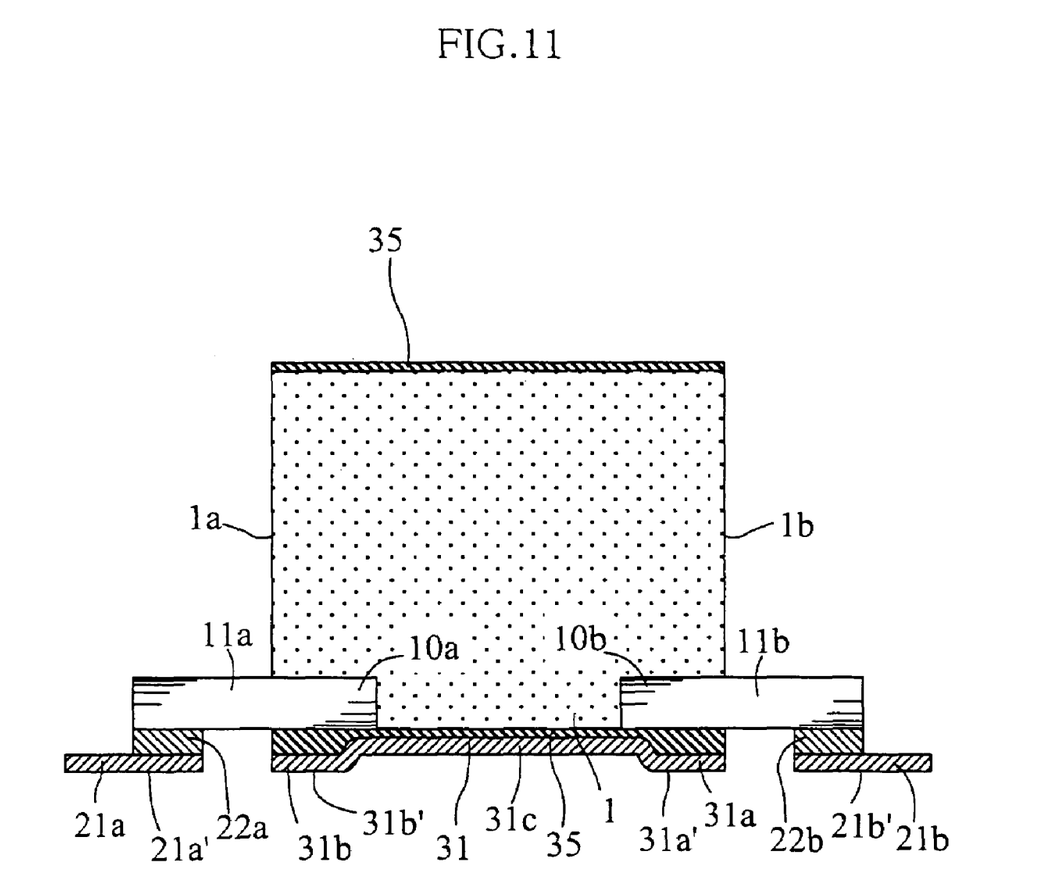
FIG. 11 shows a variation of solid electrolytic capacitor according to the present invention.

According to the present invention, as shown in FIG. 11, the anode wires 10a and 10b may be embedded in a sintered element 1 so as to come into contact with the bottom surface of the sintered element. Except for this point, the structure shown in FIG. 11 is substantially the same as that shown in FIG. 1. In FIG. 11, the illustration of the protective resin member 51 is omitted. Similarly to the foregoing embodiments, each of the anode wires is not limited to one having a circular cross section. For instance, an anode wire having a rectangular cross section or another cross section may be employed.

Figure 12:
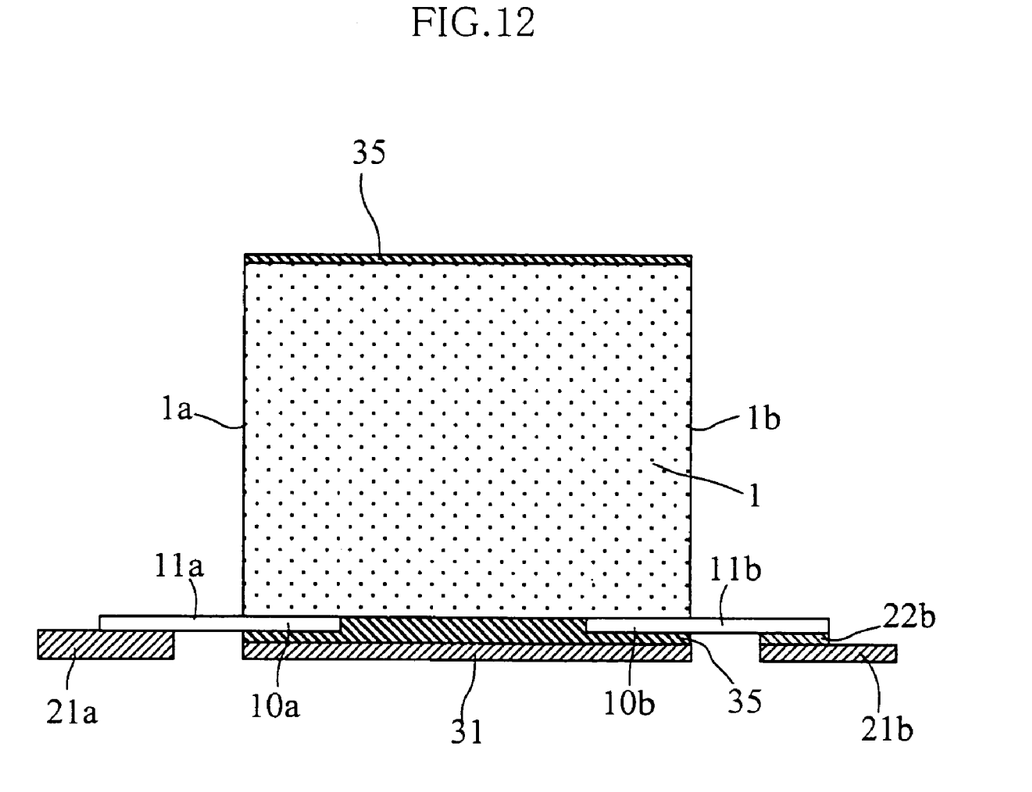
FIG. 12 shows another variation of solid electrolytic capacitor according to the present invention.

Further, as shown in FIG. 12, an end of each of the anode wires 10a and 10b may be fixed to the bottom surface of the sintered element 1 from the outside of the sintered element 1. In the figure, although the left anode wire 10a is directly connected to the external anode terminal 21a, the right anode wire 10b is connected to the other external anode terminal 21b indirectly, i.e., via a conductive member 22b. The illustrated structure is merely an example, and according to the present invention, both of the anode wires 10a and 10b may be directly connected to the external anode terminals 21a and 21b or indirectly connected to the external anode terminals 21a and 21b. Although it is preferable that each of the anode wires 10a and 10b has a rectangular cross-section, the present invention is not limited thereto. In FIG. 12 again, the illustration of the protective resin member 51 is omitted. When the sintered element 1 is made of niobium oxide, the structure shown in FIG. 11 or 12 can be easily achieved.

As noted before, it is only necessary that the position of each anode wire 10a, 10b is lower than the center of the porous sintered body 1 in the height direction. Further, the number and shape of anode wires are not limited to the foregoing embodiments and may be varied in various ways. The structure of the capacitor is not limited to the foregoing embodiments and may be of a so-called three-terminal type or feed-through type.

As the material of the porous sintered body and the inner anode terminal, niobium, niobium oxide, tantalum or other metal can be used as long as it is valve metal. The application of the solid electrolytic capacitor according to the present invention is not limited to those described above and may be varied appropriately.

The invention claimed is:

1. A solid electrolytic capacitor comprising:
   a porous sintered body of valve metal including a plurality of sintered elements;
   an internal anode terminal projecting from a respective one of the sintered elements; and
   an external anode terminal positioned lower than the internal anode terminal and having a bottom surface utilized for surface-mounting;
   wherein the internal anode terminal is provided at a position lower than a center of the porous sintered body in a height direction,
   wherein the sintered elements are aligned in a direction perpendicular to the height direction and to a projecting direction of the internal anode terminal.

2. The solid electrolytic capacitor according to claim 1 further comprising a cathode metal plate which is bonded to a lower surface of the porous sintered body and at least part of which serves as an external cathode terminal, wherein a bottom surface of the external anode terminal and a bottom surface of the external cathode terminal are flush with each other.

3. The solid electrolytic capacitor according to claim 2, wherein the cathode metal plate includes a center portion, and an end portion serving as the external cathode terminal, wherein a stepped portion is provided between the center portion and the end portion, and wherein the center portion includes an upper surface bonded to the porous sintered body and a lower surface covered by resin.

4. The solid electrolytic capacitor according to claim 1, wherein the internal anode terminal comprises a first anode wire and a second anode wire; and wherein the first anode wire and the second anode wire project from the porous sintered body in different directions from each other.

5. The solid electrolytic capacitor according to claim 4, wherein the first anode wire and the second anode wire project in opposite directions from each other.

6. The solid electrolytic capacitor according to claim 4, further comprising a conductive member connecting the first anode wire and the second anode wire to each other.

7. The solid electrolytic capacitor according to claim 6, wherein the conductive member includes a metal cover covering at least part of the porous sintered body.

8. The solid electrolytic capacitor according to claim 6, wherein the conductive member includes an anode metal, plate which is laminated on a lower surface of the porous sintered body via an insulating member and which includes a portion serving as an external anode terminal.

9. The solid electrolytic capacitor according to claim 8, further comprising a cathode metal plate intervening between the porous sintered body and the insulating member, and the cathode metal plate includes a portion serving as an external cathode terminal.

10. The solid electrolytic capacitor according to claim 1, wherein the porous sintered body includes an upper surface and a bottom surface spaced from each other in the height direction, and wherein the internal anode terminal is embedded in the porous sintered body in contact with the bottom surface.

11. The solid electrolytic capacitor according to claim 10, wherein each of the sintered elements takes the form of a plate perpendicular to the direction of alignment of the sintered elements.

12. The solid electrolytic capacitor according to claim 1, wherein the porous sintered body includes an upper surface and a bottom surface spaced from, each other in the height direction, and wherein the internal anode terminal is fixed to the bottom surface from outside of the porous sintered body.

13. A solid electrolytic capacitor comprising:
a porous sintered body of valve metal;
an internal anode terminal projecting from the porous sintered body; and
an external anode terminal positioned lower than the internal anode terminal and having a bottom surface utilized for surface-mounting;
wherein the internal anode terminal is provided at a position lower than a center of the porous sintered body in a height direction,
wherein the internal anode terminal comprises a first anode wire and a second anode wire; and
wherein the first anode wire and the second anode wire project from the porous sintered body in different directions from each other.

14. The solid electrolytic capacitor according to claim 13, wherein the first anode wire and the second anode wire project in opposite directions from each other.

15. The solid electrolytic capacitor according to claim 13, further comprising a conductive member connecting the first anode wire and the second anode wire to each other.

16. The solid electrolytic capacitor according to claim 15, wherein the conductive member includes a metal cover covering at least part of the porous sintered body.

17. The solid electrolytic capacitor according to claim 15, wherein the conductive member includes an anode metal plate which is laminated on a lower surface of the porous sintered body via an insulating member and which includes a portion serving as an external anode terminal.

18. The solid electrolytic capacitor according to claim 17, further comprising a cathode metal plate intervening between the porous sintered body and the insulating member, and the cathode metal plate includes a portion serving as an external cathode terminal.

* * * * *